(No Model.) 2 Sheets—Sheet 2.

C. P. JÜRGENSEN.
DYNAMO ELECTRIC MACHINE.

No. 249,634. Patented Nov. 15, 1881.

WITNESSES
Fred. G. Dieterich
John W. Stockett

Christopher P Jürgensen
by
Louis Bagger & Co.
INVENTOR
Attorneys.

UNITED STATES PATENT OFFICE.

CHRISTOPHER P. JÜRGENSEN, OF COPENHAGEN, DENMARK.

DYNAMO-ELECTRIC MACHINE.

SPECIFICATION forming part of Letters Patent No. 249,634, dated November 15, 1881.

Application filed July 25, 1881. (No model.)

*To all whom it may concern:*

Be it known that I, CHRISTOPHER PETER JÜRGENSEN, a subject of His Majesty the King of Denmark, and a resident of the city of Copenhagen, in the Kingdom of Denmark, have invented certain new and useful Improvements in Dynamo-Electric Machines; and I do hereby declare that the following is a full, clear, and exact description of the invention, which will enable others skilled in the art to which it appertains to make and use the same, reference being had to the accompanying two sheets of drawings, which form a part of this specification, and in which—

Figure 1:
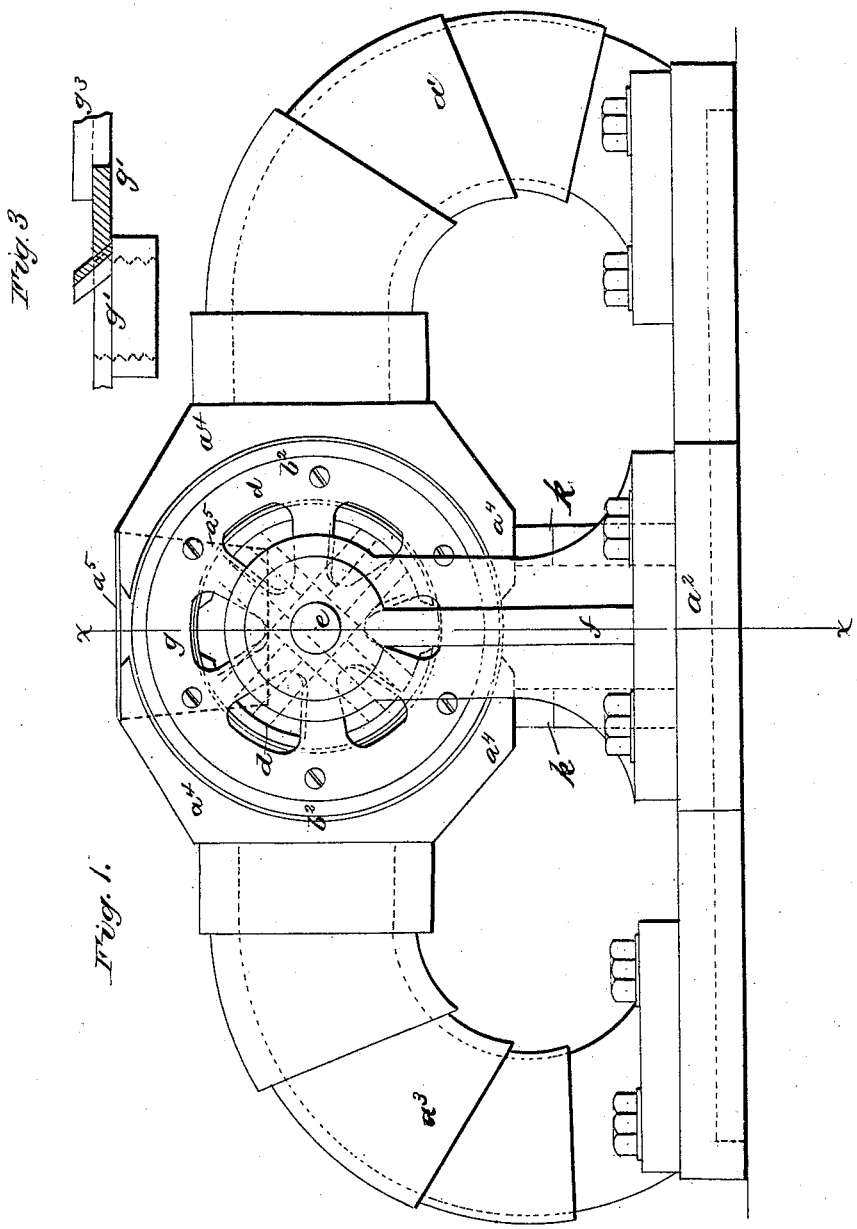
Figure 2:
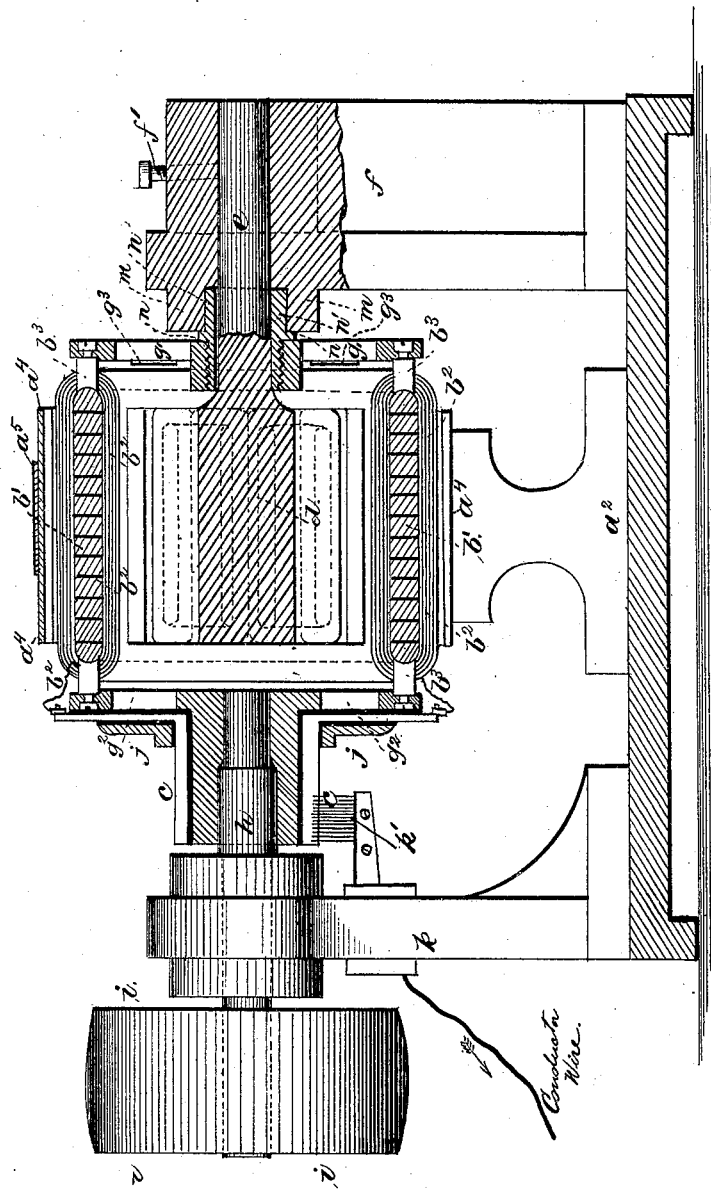

Figure 1 represents a side elevation of my improved dynamo-electric machine. Fig. 2 is a vertical cross-section of the same through line $x\ x$ in Fig. 1, and Fig. 3 is a sectional view of one of the details of the machine.

Similar letters of reference indicate corresponding parts in the several figures.

My invention has relation to dynamo-electric machines of the well-known Gramme type; and it consists in the improvements hereinafter more fully set forth, and particularly pointed out in the claims.

As in the Gramme machine, my improved machine comprises one or more pairs or sets of horseshoe electro-magnets, $a^2$, mounted upon a suitably-constructed frame or bed-piece, and the arms or forks of which are denoted, respectively, by the letters $a'$ and $a^3$. It also has the ring-formed armature composed of the annular core $b'$ and enveloping-wire $b^2$, which revolves between the poles of the stationary electro-magnets $a'\ a^3$, and is provided with a contact-cylinder, C, having brush contacts or "wipers" for picking up the electricity as it is developed by the machine. The construction and arrangement of these parts does not differ materially from the ordinary Gramme machine. Within the annular or ring-formed armature $b'\ b^2$ is placed a stationary electro-magnet, $d$, which is in the shape of two straight bars placed crosswise at right angles to one another, their positive and negative poles being connected, respectively, by a common armature. In the center of the magnet, at the point where the bars cross one another, is inserted a journal or axle, $e$, which has its bearing in a box in one of the standards, $f$, of the machine, in which it may be fastened by one or more set-screws, $f'$. This inside stationary magnet, $d$, is so adjusted in its bearing $f$ that its positive pole shall be exactly opposite to the corresponding (positive) pole of the outside stationary electro-magnets, while its negative pole faces the negative pole of the outside stationary electro-magnets.

On opposite sides of the ring-formed armature $b'\ b^2$ are secured (by means of inwardly-projecting studs $b^3\ b$) two insulated plates, (shown respectively at $g'$ and $g^2$,) which form, as it were, the heads of the cylinder $b'\ b^2$, within which the auxiliary electro-magnet $d$ is fixed. One of these plates, $g'$, has a ring of steel, $n$, which is provided with a collar or tubular journal, $n'$, that projects into the inner journal-box, $m$, of the standard $f$, without, however, touching the axle $e$ of the inside stationary electro-magnet, $d$, which is inserted through it. The ring $g^2$, on the opposite side, is fastened, by screws or otherwise, to an axle, $h$, which is journaled in the opposite standard, $k$, of the machine, and rotated by a pulley, $i$, affixed upon its outer end.

The contact-cylinder is shown at C, Fig. 2, and consists of a series of radial bars or plates of copper bent into right angles, and placed each with the edge of one arm against the face of the annular plate $g^2$ of the ring-formed armature, and with its other arm against the collar or hub of the plate. The radius-pieces C are insulated from each other by ribbons of silk or india-rubber, and also from plate $g^2$ and its hub by suitable insulating material, as shown by the heavy black line separating them. The end of the armature-wire $b^2$, terminating one coil, and the beginning of the wire of the next succeeding coil, are each attached to one radius-piece, as usual in this class of machines, and the tails of the radius-bars, which form the "contact-cylinder" proper, are all grouped together around the central hub of plate $g^2$, where they are rubbed against by suitable wire brushes or wipers, $k'$, which are attached to the standard $k$. The angle-plates or radius-pieces which comprise the contact-cylinder C are held in place by an annular jam-plate, $j$, with insulating material placed between it and the series of radius-plates.

I prefer to construct the core of the ring-formed revolving armature of annular or ring-shaped sections, which are separated from each other by rings of hard rubber or other insulating material placed between them, and in this manner I build up a cylindrical core of any desired length, around which the wire sections $b^2$ are wound and grouped. In order to prevent damage to the interposed layers or rings of rubber or other insulating material, as well as to the other component parts of the armature, I provide the spokes of plate $g'$ with projections or wings $g^3$ on its inner face, (see Figs. 2 and 3,) which operate as fans to fan a current of air into the cylindrical armature, and thus cool it off and counteract the effects of the heat generated by the electrical resistance in the group of wires wound around the cylindrical core.

In order to prevent undue vibration of the stationary electro-magnets $a'$ and $a^3$, their poles, facing one another on opposite sides of the revolving armature, are inserted into a casing, $a^4$, of non-conducting material, said casing being properly braced between the side standards, $f$ and $k$, by a bridge or plate, $a^5$, so as to serve as an envelope or casing for the ring-formed armature $b'\ b^2$, with its inside fixed electro-magnet, $d$. Both the electro-magnets $a'$ and $a^3$ are mounted upon a connecting-piece of soft iron, $a^2$, placed on the bed of the machine, so as to constitute properly a horseshoe-magnet and operate as such.

Having thus described my invention, I claim and desire to secure by Letters Patent of the United States of America—

The annular armature $b'\ b^2$, provided with the laterally-projecting lugs or studs $b^3$ and end plates, $g'\ g^2$, in combination with the annular plate $n$, having hub $n'$, and stationary electro-magnet $d$, mounted upon the adjustable shaft $e$, as shown and set forth.

In testimony whereof I have signed my name to the foregoing specification in the presence of two subscribing witnesses.

CHRISTOPHER P. JÜRGENSEN.

Witnesses:
  G. RUNG,
  V. WILLAUME JANTZEN.